United States Patent
Okubo et al.

(10) Patent No.: US 6,811,392 B2
(45) Date of Patent: Nov. 2, 2004

(54) TRACTION TYPE ELECTRIC INJECTION MOLDING MACHINE

(75) Inventors: Hiroo Okubo, Nagano-ken (JP); Tadahiro Hosokawa, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 168 days.

(21) Appl. No.: 10/114,133

(22) Filed: Apr. 2, 2002

(65) Prior Publication Data

US 2002/0142066 A1 Oct. 3, 2002

(30) Foreign Application Priority Data

Apr. 3, 2001 (JP) ........................................ 2001-105093

(51) Int. Cl.[7] .............................................. B29C 45/70
(52) U.S. Cl. .................... 425/557; 425/451.7; 425/594
(58) Field of Search ............................. 425/451.7, 557, 425/574, 594

(56) References Cited

U.S. PATENT DOCUMENTS

| | | | | |
|---|---|---|---|---|
| 3,292,214 A | * | 12/1966 | Battenfeld et al. | 425/594 |
| 4,636,167 A | * | 1/1987 | Shibata | 425/594 |
| 5,447,425 A | * | 9/1995 | Hsu et al. | 425/557 |
| 5,565,224 A | * | 10/1996 | Stillhard | 425/594 |
| 6,354,829 B1 | * | 3/2002 | Koide et al. | 425/574 |

* cited by examiner

Primary Examiner—James P. Mackey
(74) Attorney, Agent, or Firm—Weingarten, Schurgin, Gagnebin & Lebovici LLP

(57) ABSTRACT

The object of the present invention is to provide a traction type electric injection molding machine requiring only one electric motor for mold clamping and only one rotational transformer, with a mold clamping apparatus installed on the top of a bed and between the front and rear ends of the bed, and with an injection apparatus installed between them. A fixed platen 21 and a supporting platen 22 are mounted oppositely on a bed 1 and connected by tie bars 30 backward and forward. Traction rods 23 insert through the platens 21 and 22, from which their ends protrude. The tip ends of the traction rods 23 carry a movable platen 24, which can be moved toward and away from the fixed platen 21. The rear ends of the traction rods 23 carry a traction plate 25. A mold clamping apparatus 2 includes a motion transformer 29, which includes a screw shaft 26 and a nut 28. The screw shaft 26 fixed to the traction plate 25. The nut 28 is supported rotatably on the inside of the supporting platen 22 and fitted with a pulley 27. A screw preplasticating injection apparatus 3 is supported over the bed 1 between the fixed and supporting platens 21 and 22 slidably on the tie bars 30 inserting through it.

2 Claims, 3 Drawing Sheets

TRACTION TYPE ELECTRIC INJECTION MOLDING MACHINE

BACKGROUND OF THE INVENTION

1. Field of the Invention

The present invention relates to a traction type electric injection molding machine that draws a movable platen toward a fixed platen to clamp a mold. In particular, the invention relates to such a machine driven by an electric motor.

2. Detailed Description of the Prior Art

A hydraulically driven traction type injection molding machine includes a mold clamping apparatus, which includes a fixed platen and a movable platen. A pair of hydraulic cylinders are fitted on the right and left sides of the outer face of the fixed platen. The pistons of the cylinders insert through the fixed platen and protrude on both sides of the inner face of the platen. The movable platen is connected to the outer ends of the pistons and can be drawn toward the fixed platen by the hydraulic cylinders.

The mold clamping apparatus includes a hydraulic mechanism, a toggle mechanism, etc. for moving the movable platen toward and away from the fixed platen and clamping a mold. The clamping mechanism does not need to be installed on the machine bed in the rear of the movable platen and is consequently simple. When the movable platen moves relative to the fixed platen, it is possible to take out products at an end of the machine bed. A belt conveyor or another conveyor may be installed under or below the other end. This makes it possible to collect products from a number of molding machines arranged side by side. The mold clamping positions on the molding machines are adjacent to the working passages. This facilitates mold replacement, maintenance and other work. Such structure is considered to be very advantageous particularly for small molding machines.

An electric injection molding machine can be driven by electric servo motors or other electric motors. A mold can be clamped by motion transformers that are mechanisms for transforming the rotational motion of the electric motors into linear motion each by means of a screw shaft and a nut. Therefore, unlike the hydraulic molding machine, where only the hydraulic cylinders need to be fitted, it is difficult to form a mold clamping apparatus for traction by fitting the motion transformers on both sides of the fixed platen of the electric molding machine. Besides, the fixed platen needs to be large, and the two electric motors need installation spaces. It is therefore considered to be difficult to adopt mold clamping by means of traction for the electric molding machine.

In view of the foregoing situation, it is the object of the present invention to provide a new traction type electric injection molding machine that requires only one electric motor for mold clamping and only one rotational transformer, with a mold clamping apparatus installed on the top of a bed and between the front and rear ends of the bed, and with an injection apparatus installed between them, and that does not require a particularly wide fixed platen.

SUMMARY OF THE INVENTION

The present invention for the foregoing object includes a mold clamping apparatus and an injection apparatus. The clamping apparatus includes a fixed platen and a supporting platen, which are mounted oppositely on a bed and connected by a tie bar backward and forward. The clamping apparatus also includes a pair of traction rods inserting through the fixed and supporting platens. The ends of the rods protrude from both platens. The clamping apparatus also includes a movable platen fitted to the tip ends of both traction rods in such a manner that the movable platen can move toward and away from the fixed platen. The clamping apparatus also includes a traction plate fitted to the rear ends of both traction rods. The clamping apparatus also includes a motion transformer including a screw shaft and a nut. The screw shaft is fixed to the traction plate. The nut is with a pulley supported rotatably on the inside of the supporting platen. The screw shaft and the nut are in engagement with each other. The injection apparatus is supported over the bed between the fixed and supporting platens of the clamping apparatus slidably on the tie bar inserting therethrough. The injection apparatus is a screw preplasticating injection apparatus, which includes an injection plunger mechanism and a screw plasticization apparatus. The plunger mechanism is supported on the tie bar inserting therethrough. The screw plasticization apparatus is connected to an upper part of the plunger mechanism.

BRIEF DESCRIPTION OF THE DRAWINGS

These and others and advantages of the present invention will become clear from following description with reference to the accompanying drawing, wherein.

Figure 1:
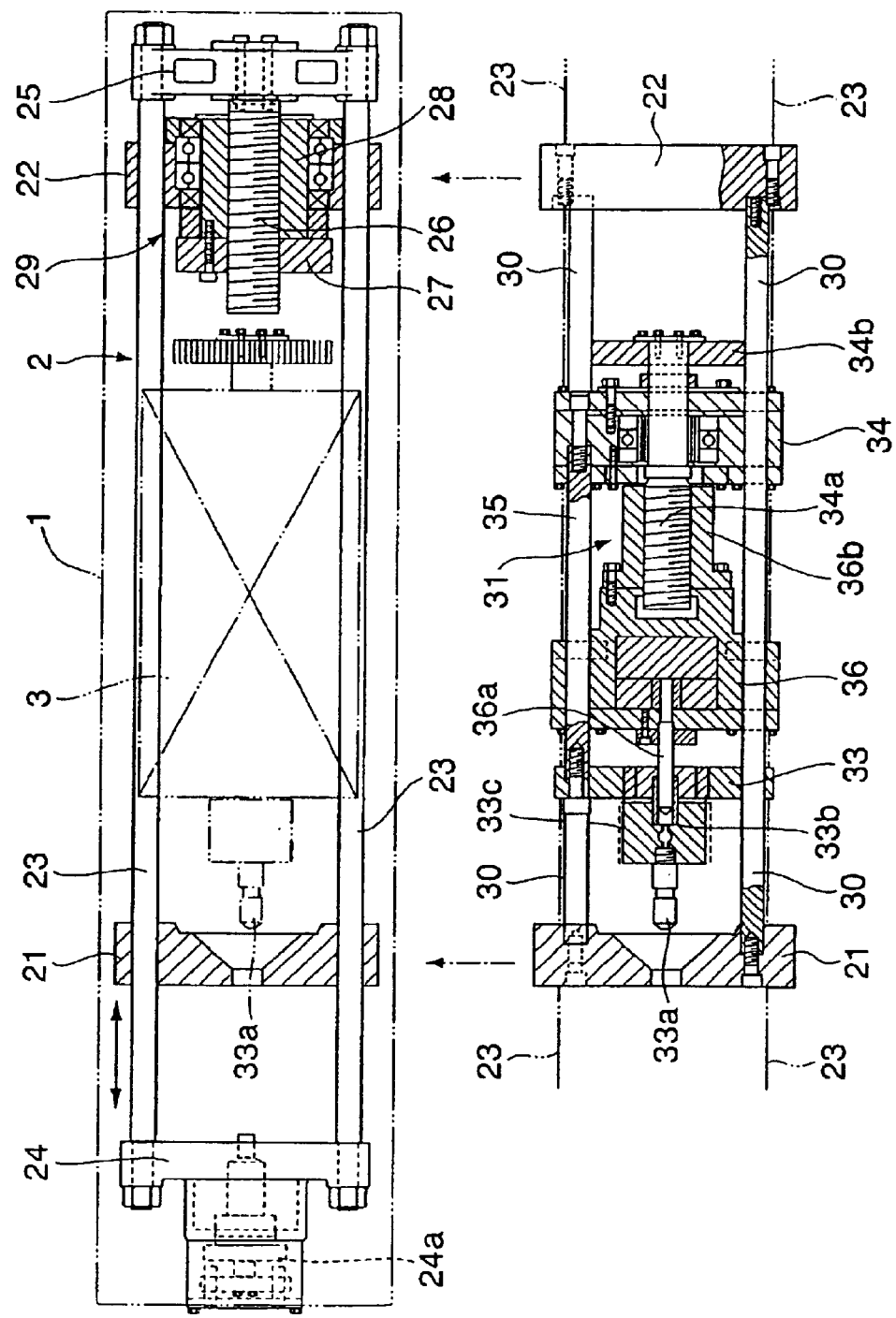
FIG. 1 is sectional plan views showing the mold clamping apparatus and the injection apparatus of a traction type electric injection molding machine according to an embodiment of the present invention.

REFERENCE NUMERALS 1. bed
2. mold clamping apparatus
3. injection apparatus
21. fixed platen
22. supporting platen
23. traction rod
24. movable platen
25. traction plate
26. ball screw shaft
27. pulley
28. ball nut
29. motion transformer for mold clamping
30. tie bar
31. injection plunger mechanism
32. screw plasticization apparatus
35. tie rod
38. nozzle touch mechanism
40. electric motor for mold clamping

DETAILED DESCRIPTION OF THE PREFERRED EMBODIMENT

While the presently preferred embodiment of the present invention has been shown and described, it will be understood that the present invention is not limited thereto, and that various changes and modification may be made by those skilled in the art without departing from the scope of the invention as set forth in the appended claims.

With reference to the drawings, an injection molding machine includes a bed 1, which is longer than those of ordinary injection molding machines. The machine also includes a traction type mold clamping apparatus 2 and an injection apparatus 3.

The mold clamping apparatus 2 consists of a fixed platen 21, a supporting platen 22, a pair of long traction rods 23, a movable platen 24, a traction plate 25, and a motion transformer 29. The fixed and supporting platens 21 and 22 are mounted oppositely on the top of the bed 1 backward and forward. The rods 23 insert through the both sides of both platens 21 and 22. The movable platen 24 is fitted to the tip ends of the rods 23 so as to move toward and away from the fixed platen 21. The traction plate 25 is fitted to the rear ends of the rods 23. The transformer 29 includes a ball screw shaft 26, which is fixed to the traction plate 25. The transformer 29 also includes a ball nut 28 in engagement with the shaft 26. The ball nut 28 with a pulley 27 is supported rotatably on the inside of the supporting platen 22.

The fixed platen 21 and the supporting platen 22 are integrally connected by a pair of tie bars 30, 30 installed across opposite corners of both platens diagonally and are mounted on the top of the bed.

The ball nut 28 of the motion transformer 29 is cylindrical and supported rotatably by a bearing, which is fixed to the inner side of the supporting platen 22. The inner end face of the nut 28 protrudes inside the supporting platen 22. The pulley 27 is bolted to this end face. The nut 28 is in engagement with the ball screw shaft 26, the rear end of which is bolted to the center of the inner side of the traction plate 25.

The ball nut 28 can be rotated together with the pulley 27 by an electric motor 40 for mold clamping, which is installed in the bed 1 and fitted with a pulley 41. The pulleys 41 and 27 are connected by a timing belt 42 so that the rotation of the motor 40 can be transmitted to the nut 28.

The rotational motion transmitted to the ball nut 28 is then transformed by the screw lead into linear motion for axially moving the ball screw shaft 26. This moves the traction plate 25, which is fixed to the shaft 26, together with the traction rods 23, moving the movable platen 24 relative to the fixed platen 21.

The traction rods 23 of the traction type mold clamping apparatus 2 insert through the fixed and supporting platens 21 and 22 on the bed 1. The clamping apparatus 2 clamps a mold with tensile force. Consequently, no bending stress is liable to develop on the long rods 23. This makes it possible to clamp the mold efficiently by means of the electric motor 40. The clamping apparatus 2 opens the mold by pushing the movable platen 24 strongly in a moment, and thereafter moving it with less force. Consequently, no bending stress is liable to develop even when the mold opens. This makes it possible to clamp the mold smoothly by means of the motor 40.

The injection apparatus 3 is mounted between the fixed and supporting platens 21 and 22 on the bed 1. Accordingly, the molding machine is nearly equal in length to the conventional straight hydraulic or conventional toggle type molding machines. The traction rods 23 insert simply through the right and left halves of the fixed platen 21. Accordingly, the fixed platen 21 does not need to be particularly wide.

The injection apparatus 3 is a screw preplasticating injection apparatus, which consists of an injection plunger mechanism 31 and a screw plasticization apparatus 32. The plunger mechanism 31 is supported by the tie bars 30 inserting through it. The plasticization apparatus 32 is connected to the top of the plunger mechanism 31.

Figure 2:
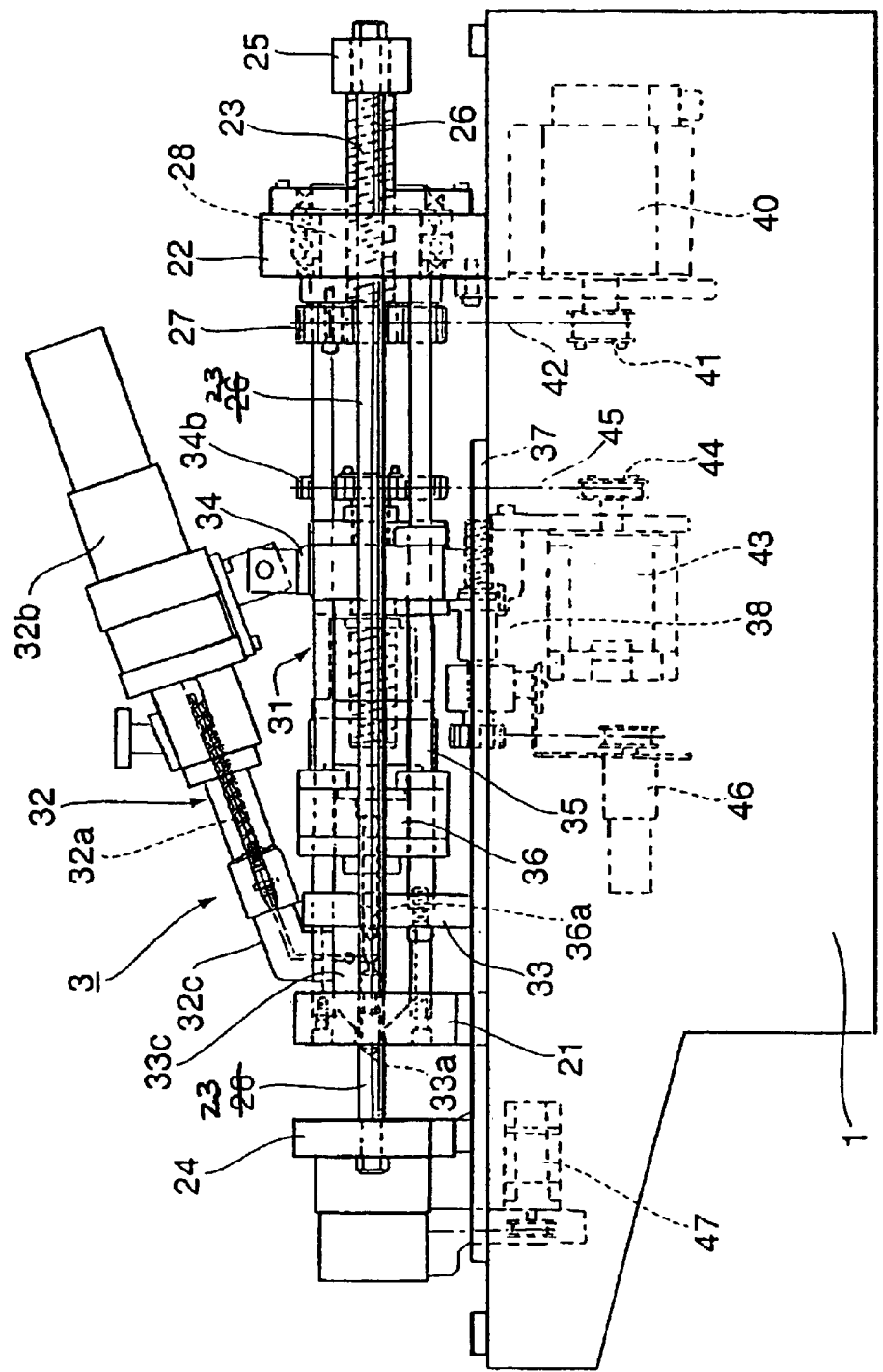
FIG. 2 is a side view of the molding machine with the clamping apparatus installed on a bed.
Figure 3:
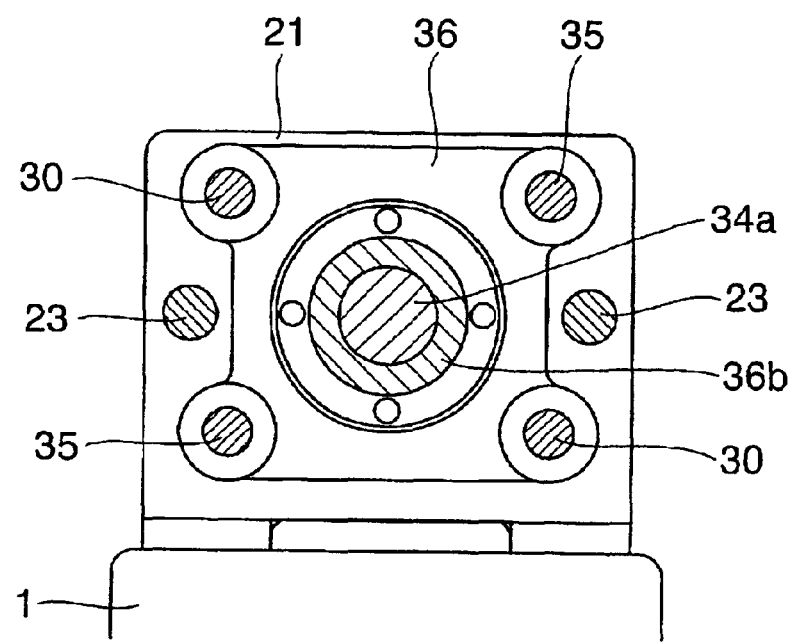
FIG. 3 is A cross section taken along the line A—A of FIG. 1.

The injection plunger mechanism 31 consists of a front unit, a rear unit and another unit. The front unit is an injector 33, which includes an injection nozzle 33a. The rear unit is an injection drive 34. The injector 33 and the drive 34 are connected by a pair of tie rods 35, which are fitted to the diagonally opposite corners other than those for the foregoing tie bars 30. The other unit is a plunger actuator 36, which is supported slidably by the rods 35 inserting through it. As shown in FIG. 2, a linear plate 37 lies on the bed 1. An electric nozzle touch mechanism 38 for moving the whole injection apparatus forward and backward is supported movably by the linear plate 37 under the injection drive 34.

The injector 33 includes a cylinder 33b formed in its center. The plunger actuator 36 includes on center of its front face an injection plunger 36a which is inserted into the cylinder 33b. The actuator 36 also includes a ball nut 36b fitted to its rear face. The ball-nut member 36b is provided with a ball screw shaft 34a for injection fitted rotatably through screwing by inserting the shaft part thereof in the center of the injection drive part 34.

On one end of the ball screw shaft 34a is fitted a pulley 34b. A timing belt 45 is wound across the pulley 34b and a pulley 44 of an electric motor 43 for injection mounted in the bed. The screw lead transforms the rotational motion into linear motion for axially moving the plunger actuator 36 together with the ball nut 36a. This enables the forward motion of the plunger 36a to inject molten resin.

The screw plasticization apparatus 32 includes a plasticating and kneading screw 32a, which is supported rotatably in a heating cylinder. The plasticization apparatus 32 also includes an electric motor 32b fitted to its rear end for rotating the screw. The screw plasticization apparatus 32 is mounted on the top of the injection plunger mechanism 31 so as to incline with the tip end of the cylinder thereof downward. The tip end of the plasticization apparatus 32 is connected through a communicating member 32c to an injection block 33c inserting the injection nozzle 33a of the injector 33 and the injection plunger 36a therein. The communicating member 32c is curved and has a resin passage with an on-off valve formed in it. This makes it possible to supply plasticated (plasticized) molten resin to the place in front of the plunger 36a in a retracted position.

Thus, the injection apparatus 3 consists of an injection plunger mechanism 31 and a screw plasticization apparatus 32, which is positioned over the plunger mechanism 31. The injection apparatus 3 is installed between the fixed and supporting platens 21 and 22 on the bed 1. Consequently, the injection apparatus 3 can be shorter than the ordinary injection apparatus, and resin can be plasticated sufficiently even though the injection apparatus 3 is installed inside the mold clamping apparatus 2. In particular, in order to mold even a small product with a slight amount of resin, a certain screw length is necessary for plasticating the resin. Consequently, it is difficult to make the molding machine smaller by shortening the machine. However, the screw preplasticating injection apparatus easily enables the traction type injection molding machine driven by the electric motors to be smaller.

Because there is no mold clamping mechanism in the rear of the movable platen 24, it is possible to install an electric push-out (ejector) mechanism 24a there. The push-out mechanism 24a and the nozzle touch mechanism 38 can be driven by motion transformers like the motion transformer 29 for mold clamping, each of which includes a ball screw shaft and a ball nut. The rotation of the nut axially moves the shaft. These motion transformers can be driven by electric motors 46 and 47 for nozzle touch and ejection respectively, which can be installed in the bed 1, as shown in FIG. 2.

All of the foregoing electric motors of the embodiment are electric servo motors. The motors for the nozzle touch mechanism 38 and the screw plasticization apparatus 32 may be electric motors each with a change gear.

What is claimed is:

1. A traction type electric injection molding machine comprising a mold clamping apparatus and an injection apparatus:

the clamping apparatus including:

a fixed platen and a supporting platen mounted oppositely on the back and front of a bed and connected by a tie bar;

a pair of traction rods inserted through the fixed and supporting platens, the ends of the rods protruding from both platens;

a movable platen fitted to the tip ends of both traction rods in such a manner that the movable platen can move toward and away from the fixed platen;

a traction plate fitted to the rear ends of both traction rods;

and a motion transformer including a screw shaft fixed to the center of the traction plate and a nut installed rotatably in the inside of the supporting platen and a pulley installed on the end of the nut facing toward the fixed platen, the screw shaft and the nut engaging with each other; and the injection apparatus being installed slidably over the bed between the fixed and supporting platens and supported by the tie bar, the tie bar being inserted through the injection apparatus.

2. A traction type electric injection molding machine according to claim 1, wherein the injection apparatus is a screw preplasticating injection apparatus including:

an injection plunger mechanism supported on the tie bar, the tie bar being inserted through the injection plunger mechanism, and a screw plasticization apparatus connected to an upper part of the plunger mechanism.

* * * * *